UNITED STATES PATENT OFFICE.

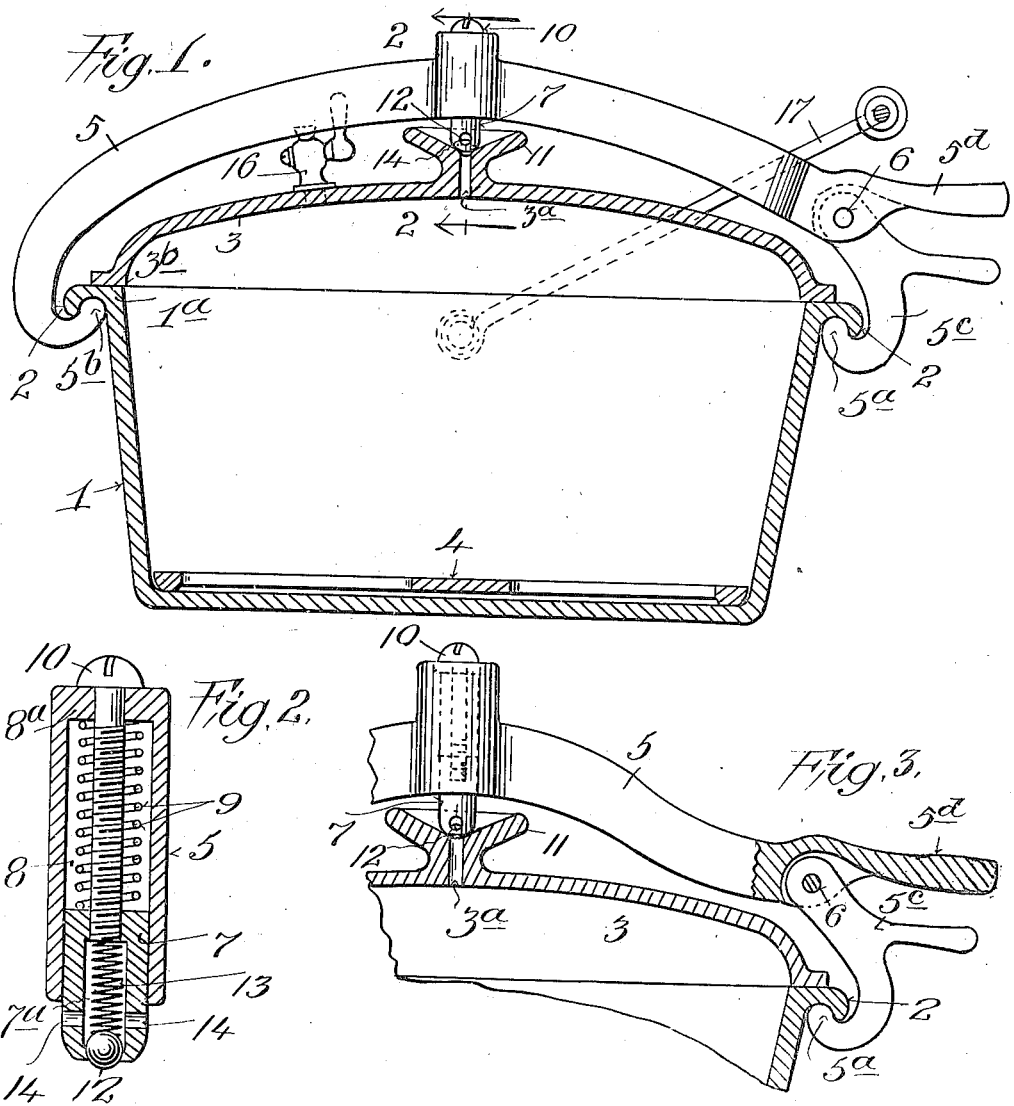
H. G. PFAEHLER & C. J. MARKS.
COOKING UTENSIL.
APPLICATION FILED MAY 24, 1913.
1,106,837.
Patented Aug. 11, 1914.

HERMAN G. PFAEHLER, OF NEW YORK, N. Y., AND CHARLES J. MARKS, OF NEW BRUNSWICK, NEW JERSEY.

COOKING UTENSIL.

1,106,837.   Specification of Letters Patent.   Patented Aug. 11, 1914.

Application filed May 24, 1913. Serial No. 769,552.

*To all whom it may concern:*

Be it known that we, HERMAN G. PFAEHLER and CHARLES J. MARKS, citizens of the United States, and residents of New York city, borough of Manhattan, county and State of New York, and New Brunswick, county of Middlesex, State of New Jersey, respectively, have invented certain new and useful Improvements in Cooking Utensils, of which the following is a specification.

Our invention relates to improvements in cooking utensils, such as kettles or pots, and has for its object to provide means to retain the lid or cover of the same tightly closed thereon, and to permit escape of steam or vapor from within the kettle according to the pressure thereof, whereby articles of food may be boiled, baked, steamed or roasted.

In carrying out our invention we provide a kettle and its lid with a substantially steam-tight joint therebetween, and a yoke or bar adapted to fit over the lid and detachably hook on or engage a flange or extension on the kettle, to retain the lid on the latter, means being provided to permit the escape of steam under pressure from within the kettle, such means preferably permitting the lid to rise slightly as required from the kettle, the yoke at all times retaining the lid in proper position upon the kettle.

Our invention further comprises novel details of improvement and combinations of parts that will be more fully hereinafter set forth and then pointed out in the claims.

Reference is to be had to the accompanying drawings forming part hereof, wherein, Figure 1 is a central sectional view of a kettle embodying our invention; Fig. 2 is an enlarged sectional view on the line 2, 2, in Fig. 1; and Fig. 3 is an enlarged detail section of a portion of Fig. 1.

Similar numerals of reference indicate corresponding parts in the several views.

The kettle or pot 1 may be of any suitable construction, but preferably of cast metal to retain the heat, is provided with an outer overhanging or hook-like flange or extension 2 adjacent to its upper edge, and is provided with a lid or cover 3 to fit on said edge. The meeting edges 1ª and 3ᵇ of the kettle and lid are preferably in the form of ground joints to afford a tight closure without requiring packing. The kettle may be provided at its bottom with a suitable grate 4 upon which articles of food may rest to keep them from direct contact with said bottom.

At 5 is a yoke or bar adapted to extend over the lid and shown provided with hook-like ends 5ª, 5ᵇ, adapted to engage the flange 2 to retain the yoke in position over the lid. The yoke 5 is shown made in two parts, the main part extending over the lid and at one end provided with a movable finger piece 5ᶜ pivotally connected with the yoke at 6. By preference the yoke has an extension 5ᵈ over the finger piece 5ª, as shown in Figs. 1 and 3, to enable the ready operation of finger piece 5ᶜ by pressing upon the extension 5ᵈ. Means are provided for resiliently retaining the lid upon the kettle by means of yoke 5, enabling the lid to move relatively to said yoke from pressure within the kettle, serving in the nature of a safety arrangement, and we have also shown means to indicate when the steam pressure within the kettle increases to a point making it advisable to reduce the heat applied, as by turning down the gas used for cooking. To this end, we have shown the yoke provided with a spring plunger 7 guided in a bore 8, the yoke located in position to be substantially central when the yoke is over the lid, said plunger being normally pressed toward the lid by a spring 9 bearing against the yoke and against the outer wall 8ª of bore 8, a screw 10 passing freely through an opening in said wall engaging the plunger and limiting its movement, whereby the plunger 7 may normally push with spring pressure upon the lid. The lid is shown provided with a centrally disposed knob or finger piece 11, recessed to receive the plunger 7. By this means the yoke 5 may be applied by placing its hooked end 5ᵇ under flange 2, causing the plunger 7 to bear upon the lid or its knob 11, pressing down on the yoke, causing the plunger 7 to slide inwardly in bore 8, and then adjusting the hooked end 5ª of finger piece 5ᶜ under flange 2, whereby the parts will be retained as in Fig. 1, and the lid will be held firmly yet resiliently upon the kettle. To indicate, as in the nature of a safety valve, that steam pressure is increasing in the kettle, the plunger 7 is shown provided with a bore 7ª in which is fitted a valve or ball 12, pressed normally to its seat by a spring 13 within bore 7ª, the latter communicating with one or more openings 14 in plunger 7, whereby when the valve 12 is raised by pressure from within the kettle, steam flowing through passage 3ª and out through opening 14, will indicate that the kettle may be moved back from the fire or the latter reduced as by turning down the gas. Said passage 3ª is shown opening through the recess of knob 11. A relief cock 16 may be provided upon the lid to allow the escape of steam and reduce the maintained pressure in the kettle when desired. The kettle may be provided with any suitable handle or bail 17.

In using our improvements, the article of food to be cooked may be placed in the kettle, the lid put over the kettle, and then the yoke fitted upon the lid, and since the yoke has resilient connection with the kettle, or is of resilient material, the finger piece 5ᶜ may be readily adjusted under the flange 2 by depressing the adjacent end of the yoke and then the spring pressure will retain the parts firmly yet resiliently together. Various articles of food may be advantageously cooked in our improved kettle, since the vapor rising from the juices of the food may be retained tightly within the kettle and only allowed to escape in proportion as the pressure within the kettle rises above a desired amount. Therefore, vegetables may be readily cooked with comparatively little water, since their own juices are retained in the kettle, affording a required moisture; meats may be stewed or roasted in the kettle retaining their juices, and bread and other articles may be baked in the kettle, all with the advantage of retaining the juice and aroma and preventing the juice from escaping in the form of vapor or steam as in ordinary open kettles or kettles with loose lids. By reason of the closely retained lid having the spring-acting resistance thereon, the pressure utilized within the kettle enables cooking to be accomplished with less heat than with a loose lid, since when the pressure is increased corresponding to the spring tension on the lid, a saving may be effected by reducing the heat applied and the cooking will continue.

Changes may be made in the details and arrangements of parts set forth, within the scope of the appended claims, without departing from the spirit of the invention.

Having now described our invention what we claim is:

1. A vessel having a lid, combined with a yoke having resilient means for retaining the lid upon the vessel, and means for detachably securing the yoke to the vessel over the lid, said yoke having a movable finger piece to connect with the vessel, and having an extension above the finger piece to aid in operating the latter.

2. A kettle provided with a flange, a lid having an aperture, and a yoke to fit over the lid and having means to engage said flange, said yoke carrying a spring-acting movable member adapted to resiliently keep the lid closed, said member having a valve to normally close the aperture in the lid when the yoke is attached to the flange and over the lid.

3. A kettle having a lid and provided with a flange, a yoke to fit over the lid and having means to engage said flange, said yoke having a plunger, a spring between the yoke and plunger to keep the lid closed, said plunger having a valve registering with a passage in the lid.

4. A kettle having a lid and provided with a flange, a yoke to fit over the lid and having means to engage said flange, said yoke having a slidable plunger, a spring coacting with said yoke and plunger, said plunger having a bore opening at the end of the plunger and an opening communicating with said bore, said bore registering with a passage in the lid, and a spring pressed valve in said bore normally closing said end opening of said bore.

5. A kettle having a lid and provided with a flange, combined with a yoke having hook-like end portions to engage said flange, said yoke having a bore, a plunger slidable in said bore, an extension passing through said bore and connected with said plunger, and a spring within said bore pressing against said plunger, the plunger having a valve, the lid having a passage registering with the valve.

6. A kettle having a lid and provided with a flange, combined with a yoke having hook-like end portions to engage said flange, said yoke having a bore, a plunger slidable in said bore and having an extension passing through said bore and guided by said plunger, a spring within said bore pressing against said plunger to force it toward the lid, said lid having a knob adapted to receive said plunger and provided with a passage opposed to the plunger, said plunger having a spring-pressed valve to normally close said passage.

7. A vessel having a lid and provided with a flange, combined with a yoke having hook-like end portions to engage said flange, said yoke having a bore, a plunger slidable in said bore and having an extension passing through said bore and provided with a head to coact with the yoke, a spring within said bore pressing against said plunger, said lid having a knob adapted to receive said plunger, said lid and knob having a passage registering with said plunger, said plunger having a spring acting valve to normally close said passage.

8. A kettle provided with a flange and having a lid combined with a yoke having hook-like end portions to engage said flange, one of said end portions being pivotally connected with said yoke and having a finger piece, said yoke extending outwardly over said pivotal end portion and its finger piece.

Signed at New York city, in the county of New York, and State of New York, this 21st day of May, 1913.

HERMAN G. PFAEHLER.
CHARLES J. MARKS.

Witnesses:
T. F. BOURNE,
MARIE F. WAINRIGHT.